(12) United States Patent
Landis

(10) Patent No.: US 11,731,470 B2
(45) Date of Patent: *Aug. 22, 2023

(54) CONNECTING STRAPS FOR SPORTS ACTIVITIES

(71) Applicant: Eric Michael Landis, Grand Junction, CO (US)

(72) Inventor: Eric Michael Landis, Grand Junction, CO (US)

(*) Notice: Subject to any disclaimer, the term of this patent is extended or adjusted under 35 U.S.C. 154(b) by 119 days.

This patent is subject to a terminal disclaimer.

(21) Appl. No.: 16/987,523

(22) Filed: Aug. 7, 2020

(65) Prior Publication Data

US 2020/0398621 A1 Dec. 24, 2020

Related U.S. Application Data

(63) Continuation-in-part of application No. 16/946,058, filed on Jun. 4, 2020.

(60) Provisional application No. 62/864,757, filed on Jun. 21, 2019.

(51) Int. Cl.
| | |
|---|---|
| *B60D 1/18* | (2006.01) |
| *B60D 1/52* | (2006.01) |
| *B62J 50/00* | (2020.01) |
| *B62K 27/14* | (2006.01) |

(52) U.S. Cl.
CPC .............. *B60D 1/187* (2013.01); *B60D 1/52* (2013.01); *B62J 50/00* (2020.02); *B62K 27/14* (2013.01)

(58) Field of Classification Search
CPC .......... B62J 50/00; B62K 27/14; B60D 1/187; B60D 1/52; B60D 2001/003; B60D 1/18; A63B 21/0407; A63B 21/28
See application file for complete search history.

(56) References Cited

U.S. PATENT DOCUMENTS 5,205,803 A * 4/1993 Zemitis .................... D07B 1/18
 482/121
5,518,481 A 5/1996 Darkwah
(Continued)

FOREIGN PATENT DOCUMENTS

WO 2011081534 A1 7/2011

OTHER PUBLICATIONS

"Overview of Materials for Nylon 6, Cast", MatWeb.com, [online], Year: 2017 [retrieved on Nov. 23, 2021]. Retrieved from <url: http://matweb.com/search/DataSheet.aspx?MatGUID= 8d78f3cfc6f49d595896ce6ce6a2ef1&ckck=1>, 3 pages.

*Primary Examiner* — Minnah L Seoh
*Assistant Examiner* — Ryan Edward Hardy
(74) *Attorney, Agent, or Firm* — Heuton IP Law, LLC

(57) ABSTRACT

Connecting straps for use for example in sports activities and methods of attaching the connecting straps. In one example, a connection strap system includes a connecting strap and a peg strap configured to be attached to the connecting strap. An example of the connecting strap includes (a) a sleeve of webbing having a first end and a second end and having a loop at each end, each loop having a base and a free end, (b) disposed within the sleeve of webbing, a band of elastic material extending in a continuous loop, and (c) an attachment strap, adjacent each loop, configured to secure a portion of the band to the webbing at the base of each loop. In some cases, the band has a solid, polygonal cross-sectional shape. The peg strap has a peg-loop at each end.

20 Claims, 12 Drawing Sheets

(56) References Cited

U.S. PATENT DOCUMENTS

| | | | |
|---|---|---|---|
| 7,794,374 B1* | 9/2010 | Park | A63B 23/12 |
| | | | 482/122 |
| 7,798,712 B2 | 9/2010 | Russick | |
| 10,384,094 B1* | 8/2019 | Newman | A63B 21/4035 |
| 2007/0232468 A1 | 10/2007 | Levy et al. | |
| 2009/0091100 A1* | 4/2009 | Barraza | B62K 27/12 |
| | | | 280/292 |
| 2012/0202659 A1 | 8/2012 | Wroclawsky | |
| 2013/0067697 A1* | 3/2013 | Huang | A63B 21/0555 |
| | | | 24/301 |
| 2013/0134689 A1* | 5/2013 | Barajas | B60D 1/18 |
| | | | 280/480 |
| 2019/0351968 A1* | 11/2019 | Olszewski | B62K 13/025 |

* cited by examiner

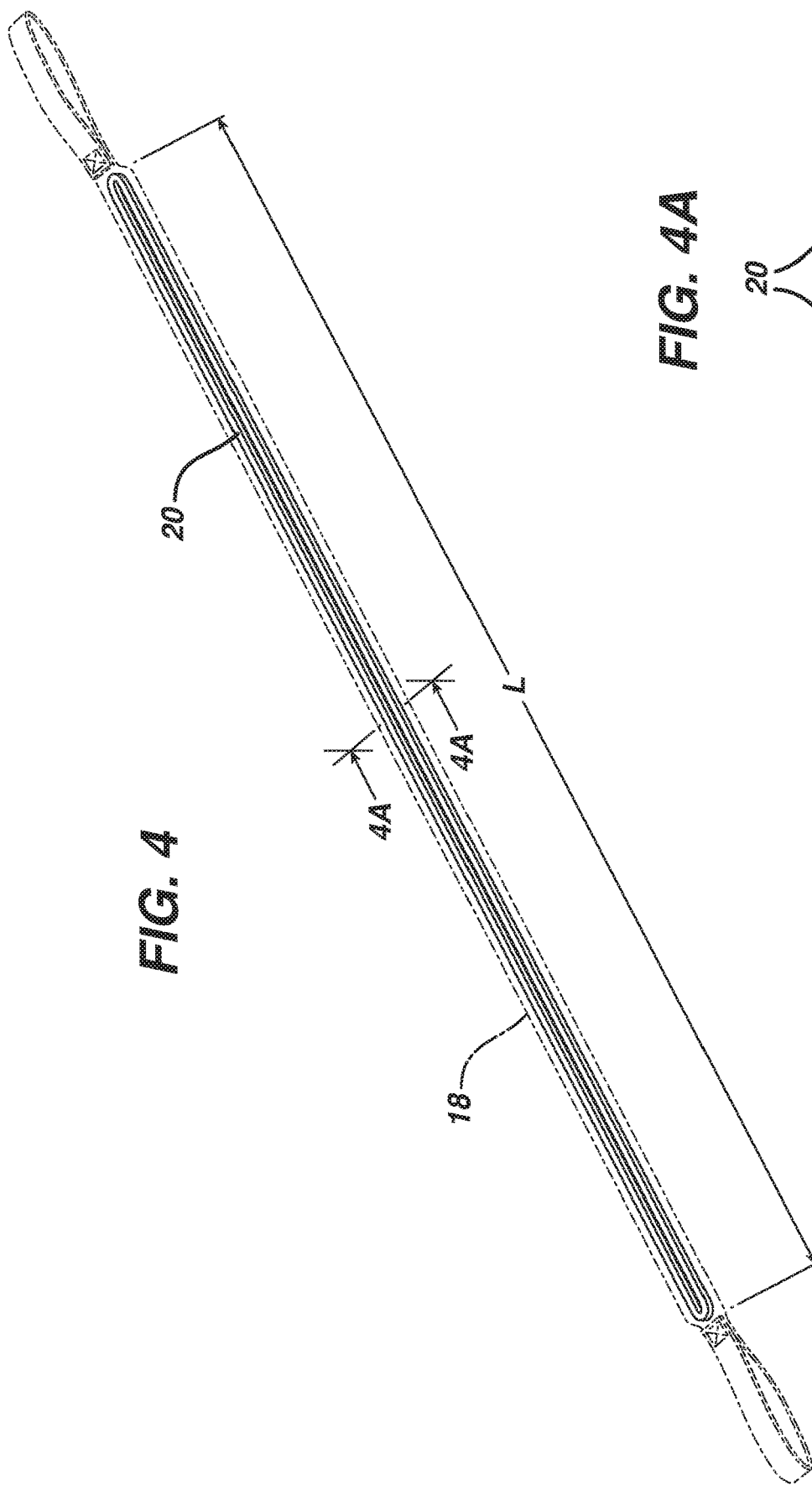
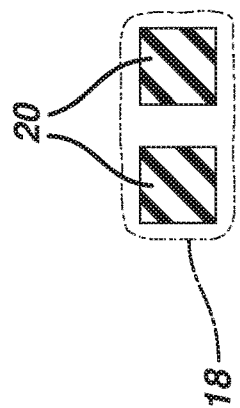

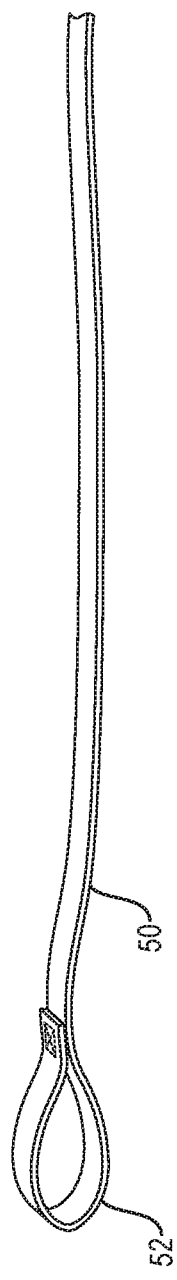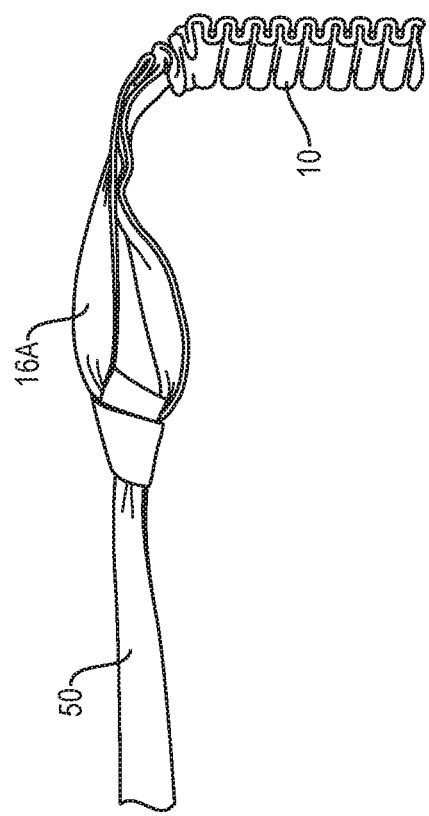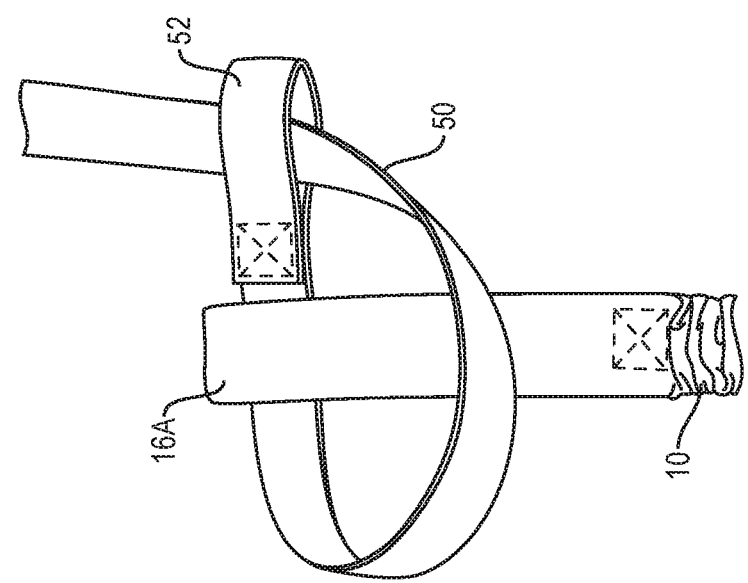

CONNECTING STRAPS FOR SPORTS ACTIVITIES

CROSS-REFERENCE TO RELATED APPLICATIONS

This application is a continuation-in-part of and claims priority to co-pending U.S. application Ser. No. 16/946,058 filed on Jun. 4, 2020, which claims priority to U.S. Provisional Application Ser. No. 62/864,757 filed on Jun. 21, 2019, the entire disclosures of which are incorporated herein by reference.

BACKGROUND

When two participants of unequal strength or ability, for example an adult and child, participate in certain sporting or leisure activities together, such as riding bicycles or motorbikes or skiing together, it can be difficult or even impossible for them to both maintain the same speed. In some cases, such as bicycling uphill, the less proficient participant will fall behind, while in other cases, such as downhill skiing, the less proficient participant may end up unintentionally going too fast and potentially losing control. Thus, for safety and enjoyability of the activity it can be desirable to provide a way to join the two participants together.

However, it is important from a safety standpoint that any type of connecting strap be strong enough to avoid failure due to the forces that will be encountered, not dangle onto the ground or into a rider's wheel, and not jerk either user during use.

SUMMARY

The present disclosure pertains to connecting straps, and in particular to straps for connecting two persons taking part in a sports activity, or in some cases a person and an object to be towed.

In one aspect, the disclosure features a connecting strap that includes (a) a sleeve of webbing having a first end and a second end and having a loop at each end, each loop having a base and a free end, (b) disposed within the sleeve of webbing, a band of elastic material extending in a continuous loop, and (c) an attachment strap, adjacent each loop, configured to secure a portion of the band to the webbing at the base of each loop.

Some implementations of the connecting strap include one or more of the following features.

The band may have a solid, polygonal cross-sectional shape. The cross-sectional shape of the band may be, for example, square or rectangular.

The attachment strap may be formed of polyester or nylon. In some cases, the attachment strap will bunch up when tension is released from the elastic band causing the elastic band to draw it together. The attachment strap has two ends, and preferably is looped through the band and secured by stitching both ends of the attachment strap to the webbing. In some cases, each loop is formed by doubling a free end of the sleeve back and securing the free end in place with the same stitching that secures the ends of the attachment strap to the webbing, thereby forming the base of the loop with one continuous piece of webbing.

In some implementations, the webbing sleeve is configured for a maximum elongation of 4:1 and the band is configured for a maximum elongation of 7:1. The band may be formed of a natural rubber or thermoplastic elastomer, for example, of dipped natural latex. In some cases, the band is configured to pull no more than 18 pounds of weight, for example, no more than 15 pounds of weight, before the webbing sleeve engages and takes the load. The webbing sleeve is configured to prevent the rubber from being over stretched as well as protecting the rubber from UV damage. The band may, for example, have a length of from about 40 to 50 inches when in a relaxed (unstretched) condition. At full extension the length of the band can reach about 160 to 200 inches. The webbing sleeve may be formed of polypropylene or nylon.

In another aspect, the present disclosure features methods of utilizing the connecting straps disclosed herein to tow a person or object while engaging in a sports activity. The person who is doing the towing may attach the connecting strap to his or her body (e.g., around the waist) or to a bicycle or other article of sports equipment being used by the person towing. The other end of the connecting strap is attached to the person or item to be towed.

In some implementations a connection system comprises a connecting strap including a webbing sleeve having a first end and a second end and having a loop at each end, each loop having a base and a free end, and disposed within the webbing sleeve, a band of elastic material extending in a continuous loop, the connecting strap further including an attachment strap, adjacent each loop, configured to secure a portion of the band to the webbing at the base of each loop. The connection system further includes a peg strap having a peg-loop at each end, the connecting strap being attached to the peg strap.

Some implementations of the connecting strap include any one or more of the features discussed above.

Some implementations of the peg strap include one or more of the following features.

The peg strap may be formed of a substantially inextensible material. For example, the peg strap may be made of a nylon or woven polypropylene webbing. In some examples, the webbing of the peg strap may have a width of approximately one inch and a thickness in a range of 0.070 to 0.075 inches. In one example, the webbing of the peg strap has a breaking strength of 3000 pounds, and is capable of handling a working load of at least 1000 pounds.

In some examples, the peg strap has a length in a range of 60 inches to 80 inches. In one example, the peg strap has a length of about 67 inches. In some examples, each peg loop has a length, measured when flattened against a surface, of from about 3 to 7 inches, and in one example, the length of each peg loop is about 5 inches.

In some implementations, the connection system further includes a release strap attached to the connecting strap such that the connecting strap is connected at one end to the peg strap and at an opposite end to the release strap, the connecting strap being thus positioned between the peg strap and the release strap.

Some implementations of the release strap include one or more of the following features.

In some examples, the release strap is formed of a substantially inextensible material. The release strap may be made of the same material as the peg strap.

In certain examples, the release strap includes an end-loop at one end. The release strap can be attached to the connecting strap by being passed through and looped around one loop of the connecting strap and passed through its end-loop.

Certain aspects are directed to methods of connecting two motorcycles together.

In some implementations, such a method comprises acts of (a) draping a peg strap over a top of a first motorcycle, the peg strap having a peg loop at each end and being made of a substantially inextensible material, (b) looping each peg loop of the peg strap around a corresponding foot peg of the first motorcycle, (c) attaching a first end of a connecting strap to a central region of the peg strap between the ends of the peg strap, and (d) attaching a second end of the connecting strap to a second motorcycle.

The peg strap and the connecting strap may each include any one or more of the features discussed above.

In some implementations of the method, the connecting strap includes a first loop at its first end and a second loop at its second end, wherein attaching the first end of the connecting strap to the peg strap includes (a) looping the first end of the connecting strap around the central region of the peg strap, (b) passing the second end of the connecting strap over the peg strap and through the first loop to form a first connection between the connecting strap and the peg strap, and (c) pulling the first connection tight to form a knot around the central region of the peg strap.

In some examples of the method, attaching the second end of the connecting strap to the second motorcycle includes (a) attaching a first end of a release strap to the second end of the connecting strap, and (b) wrapping a second end around a portion of a handlebar region of the second motorcycle.

According to some implementations the release strap includes an end-loop at the first end of the release strap, and attaching the first end of the release strap to the connecting strap includes (a) passing the release strap through the second loop of the connecting strap, (b) wrapping the release strap around the second of the connecting strap and passing a second end of the release strap through the end-loop to form a second connection between the release strap and the connecting strap, and (c) pulling the second connection tight to secure the release strap to the connecting strap.

Further aspects are directed to a Y-strap for connecting two motorcycles together.

According to some implementations such a Y-strap comprises a length portion including a webbing sleeve having first and second ends, and a band of elastic material disposed within the webbing sleeve and extending in a continuous loop, the webbing sleeve including a first loop disposed at the first end of the webbing sleeve, the length portion further including a pair of attachment straps each configured to secure a portion of the band to the webbing sleeve at the first and second ends. The Y-strap further comprises first and second strap portions extending from the second end of the webbing sleeve, each of the first and second strap portions having a peg loop formed at respective ends of the first and second strap portions distal to the webbing sleeve.

Implementations of the Y-strap may include one or more of the following features.

In one example, the first and second strap portions are extensions of the webbing sleeve. In another example, the first and second strap portions are sewn or otherwise attached to the second end of the webbing sleeve.

The band may have a solid, polygonal cross-sectional shape. The cross-sectional shape of the band may be, for example, square or rectangular.

The attachment strap may be formed of polyester or nylon. In some cases, the attachment strap will bunch up when tension is released from the elastic band causing the elastic band to draw it together. The attachment strap has two ends, and preferably is looped through the band and secured by stitching both ends of the attachment strap to the webbing. In some cases, the first loop of the webbing sleeve is formed by doubling a free end of the sleeve back and securing the free end in place with the same stitching that secures the ends of the attachment strap to the webbing, thereby forming the base of the loop with one continuous piece of webbing.

In some implementations, the webbing sleeve is configured for a maximum elongation of 4:1 and the band is configured for a maximum elongation of 7:1. The band may be formed of a natural rubber or thermoplastic elastomer, for example, of dipped natural latex. In some cases, the band is configured to pull no more than 18 pounds of weight, for example, no more than 15 pounds of weight, before the webbing sleeve engages and takes the load. The webbing sleeve is configured to prevent the rubber from being over stretched as well as protecting the rubber from UV damage. The band may, for example, have a length of from about 40 to 50 inches when in a relaxed (unstretched) condition. At full extension the length of the band can reach about 160 to 200 inches. The webbing sleeve may be formed of polypropylene or nylon.

In certain examples the first and second strap portions and the webbing sleeve are made of a substantially inextensible material. For example, the first and second strap portions may be made of a nylon or woven polypropylene webbing. In some examples, each of the strap portions has a width of approximately one inch and a thickness in a range of 0.070 to 0.075 inches. In one example, each of the strap portions a breaking strength of 3000 pounds. The strap portions may be made of the same material as the webbing sleeve or a different material.

In some examples, each of the strap portions has a length in a range of 30 inches to 40 inches. In some examples, each peg loop has a length, measured when flattened against a surface, of from about 3 to 7 inches, and in one example, the length of each peg loop is about 5 inches.

In another aspect, the disclosure features a peg strap designed to facilitate attachment of embodiments of the connecting strap disclosed herein to a motorcycle. In certain implementations, the peg strap is made of a substantially inextensible material, such as a nylon or woven polypropylene webbing or rope, for example. The material of the peg strap may be chosen to have sufficient strength to handle the load forces that may be generated by the pull of one motorbike against another when the two motorbikes are connected together using the peg strap and the connecting strap and are in use. In certain examples, the peg strap has a breaking strength of about 3000 pounds.

The peg strap includes a peg loop at each end of its length. The peg loops are sized to loop around the foot pegs of a motorcycle. In certain examples, each peg loop has a length, measured when flattened against a surface, of from about 3 to 7 inches, and in one example, the length of each peg loop is about 5 inches. The length of the peg strap may be chosen such that the peg strap can be hooked over a motorcycle to the left and right foot pegs with enough length to pull backward on the motorcycle toward the end of the seat, but not too far to pull off the back of the bike. In certain examples, the peg strap has a length in a range of 60 inches to 80 inches. In one example, the peg strap has a length of about 67 inches.

Still other aspects, embodiments, and advantages of these exemplary aspects and embodiments are discussed in detail below. Embodiments and implementations disclosed herein may be combined with other embodiments and implementations in any manner consistent with at least one of the principles disclosed herein.

DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIG. 4 is a perspective view of the band, with the webbing sleeve shown in phantom lines and the attachment straps omitted for clarity;

FIG. 4A is a cross-sectional view of the band taken along line 4A-4A in FIG. 4;

FIG. 12 is a perspective view of an example of a release strap according to one implementation;

FIG. 13A is a perspective showing connecting one example of a method of attaching a connecting strap to a release strap according to one implementation;

FIG. 13B is a perspective view showing the connecting strap and the release strap of FIG. 13A connected together;

DETAILED DESCRIPTION

Aspects and embodiments are directed to connection systems including one or more connection straps and methods of attaching the connection strap(s), that allow two persons to engage in a joint sporting activity or allow a person to tow an object.

Figure 1:
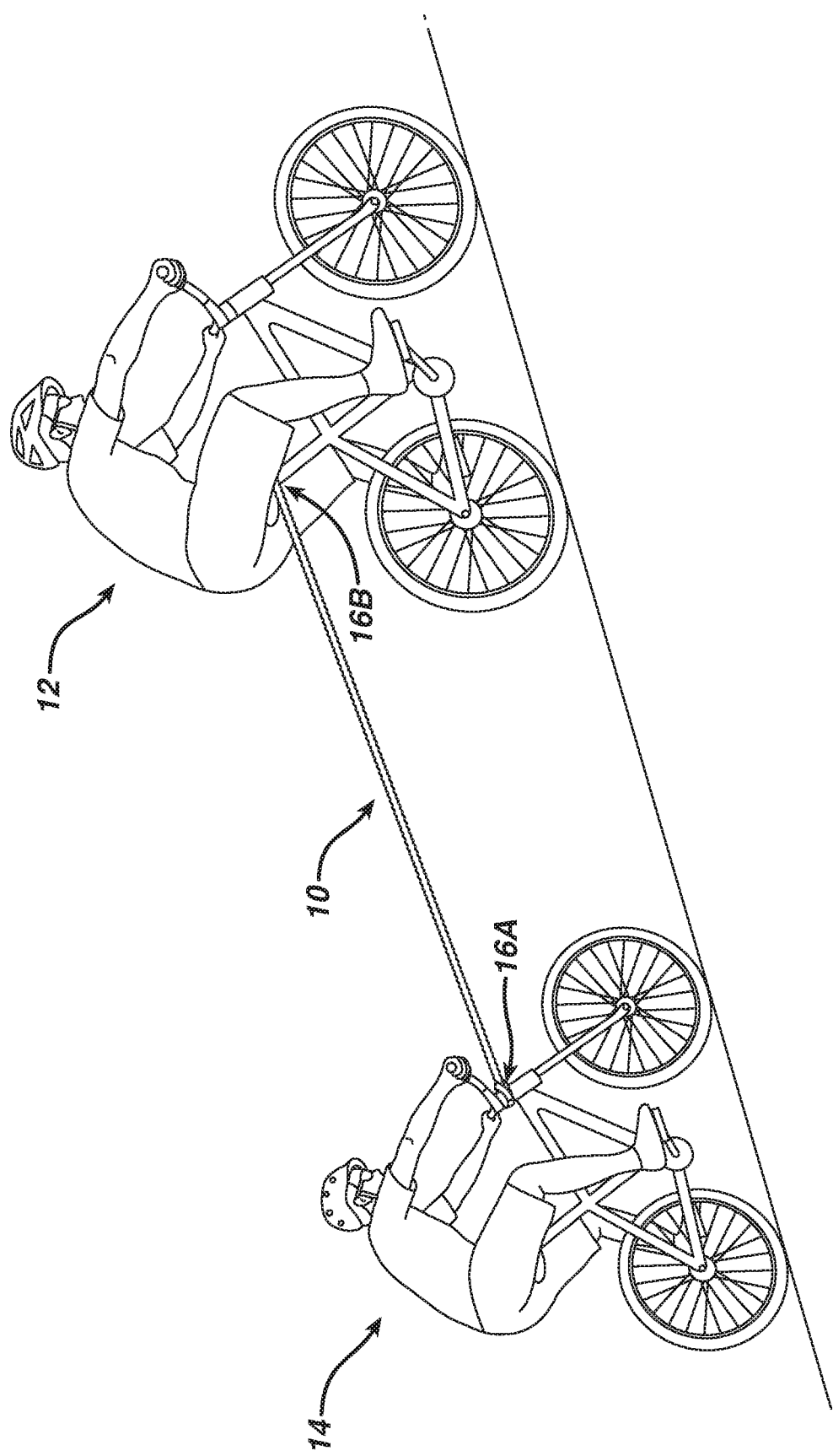
FIG. 1 is a perspective view of a pair of users using a connecting strap according to one implementation while bicycling.

Referring to FIG. 1, a connecting strap 10 is used to allow a pair of users 12, 14 of different abilities to bicycle together. This is but one example of a possible use of the connecting strap 10; other uses will be discussed below. In this example, a loop 16A at a first end of the connecting strap is girth hitched around the stem of the bike of user 14, while a loop 16B at the opposite end of the connecting strap is slipped over the saddle of the bicycle of user 12 such that it is looped around the seat post of user 12. This arrangement securely attaches the connecting strap at both ends and allows quick and easy attachment and removal. It is generally preferred that loops 16A and 16B be large enough to allow this type of attachment; however, if smaller loops are provided attachment can be by other means, e.g., a locking carabiner threaded through the loop. In some implementations, the loop has a length, when flattened against a surface, of from about 3 to 6 inches. In other examples, other methods of attaching the connecting strap 10 to the bike of user 14 may be implemented, such as by using a supplemental strap, for example, as discussed further below.

Figure 2:
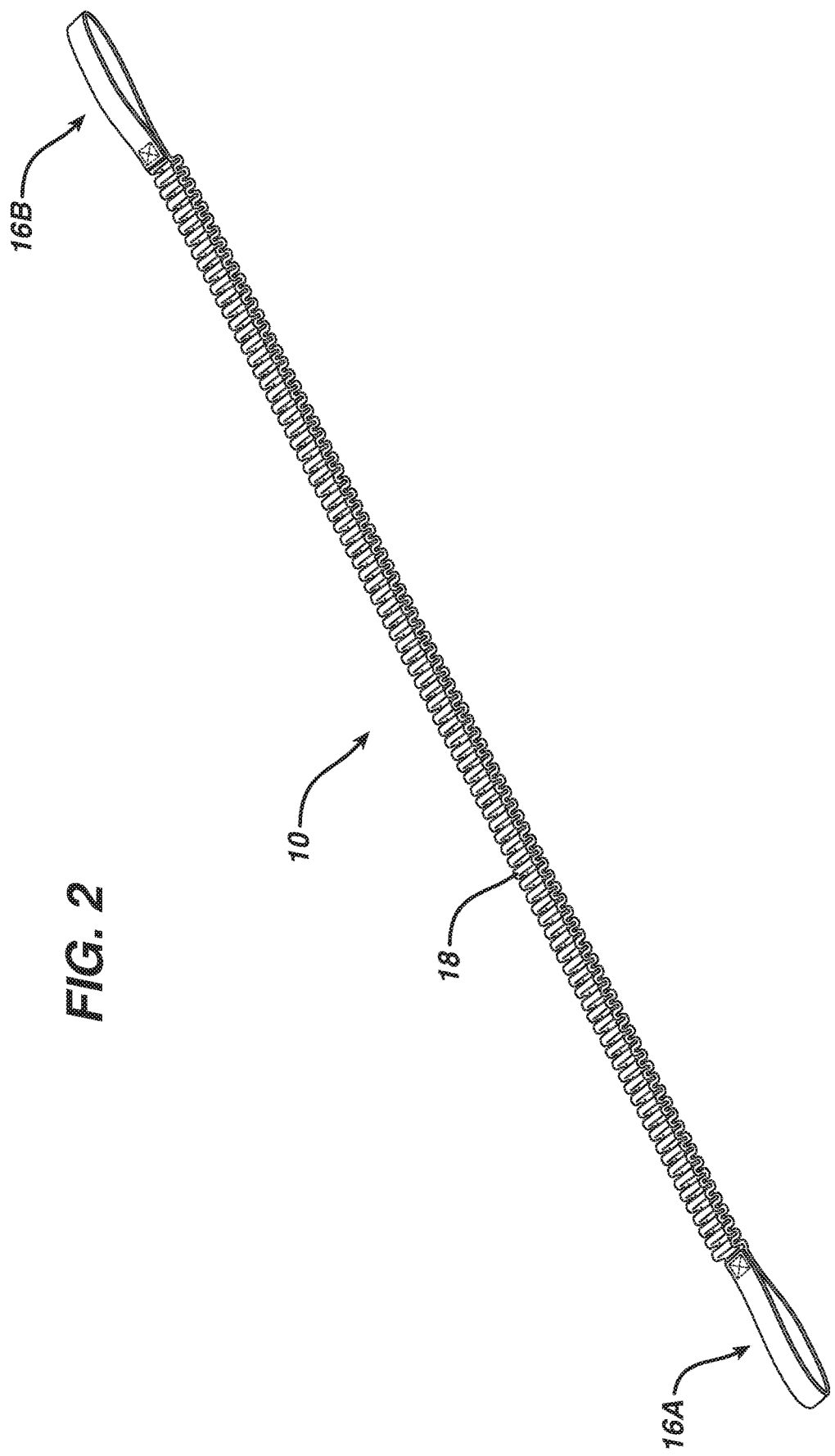
FIG. 2 is a perspective view of a connecting strap according to one implementation, in a relaxed condition.
Figure 5:
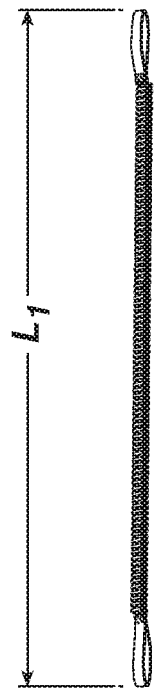
FIG. 5 is side view of the connecting strap in a fully relaxed (unstretched) condition.
Figure 6:
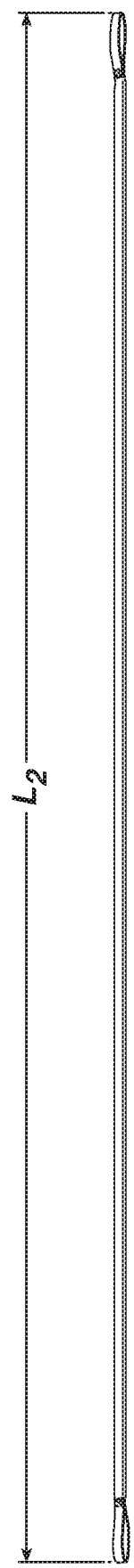
FIG. 6 is a side view of the connecting strap in a fully extended (stretched) condition, in which the webbing prevents over-stretching of the band.

Referring now to FIG. 2 and FIGS. 5-6, the connecting strap 10 includes an outer sleeve 18 of webbing material which may be formed, for example, of woven polypropylene or Nylon. As shown in FIG. 4, a continuous band of elastic material 20 is disposed within the sleeve 18.

The webbing material itself is substantially inextensible, but the sleeve is bunched up relative to the inner elastic band 20 during manufacture so that the sleeve can be extended to a much greater length by pulling on the opposite loops. For example, the ratio between the length $L_1$ of the sleeve in the fully relaxed (bunched up) state (FIG. 5) and the length $L_2$ in the fully extended state (FIG. 6) may be from about 1:3 to 1:4 (a stretch ratio of 3:1 to 4:1). The use of webbing in this bunched up arrangement around an elastic core is well known in the dog leash art. $L_1$ may be, for example, about 45 to 65 inches, and $L_2$ may be from about 160 to 200 inches.

The inner band 20 is formed of a natural or synthetic rubber material that has greater extensibility than the sleeve. The band may have a length $L_1$ in its unstretched condition of from about 40 to 50 inches ($L_1$ being the length of the loop measured as shown in FIG. 4, not the total length of the material forming the loop.) At full extension the band may have a length $L_2$ of about 160 to 200 inches. Thus, for example, the elasticity of the band may be such that the band could, if not inhibited by the sleeve, stretch to at least 4 times its relaxed length, i.e., have a stretch ratio of at least 4:1. In some implementations, the band can stretch to 6 or more times its relaxed length, e.g., the band may have a stretch ratio of greater than 6:1 or even 7:1 or more. Because the band is not fully stretched when further stretching is stopped by full extension of the sleeve 18 there is a safety factor to prevent inadvertent breaking of the band during use. It is preferred for many applications that the webbing forming the sleeve have a tensile strength of at least 1000 lbs., preferably at least 1500 lbs.

The band is preferably configured such that it pulls no more than 18 pounds, and in some implementations, no more than 15 pounds (for example, between 13 and 18 pounds) at the point at which it is fully extended to length $L_2$ (at which point the webbing sleeve takes any additional load.)

As shown in FIG. 4A, the band 20 has a square cross-section, and is solid rather than hollow. However, other cross-sectional shapes can be used, as well as hollow tubing. It is preferred, however, that the band be a continuous loop, as shown, rather than a length of material the ends of which are glued or tied together. The use of a continuous band contributes to the strength and durability of the connecting strap.

Figure 3:
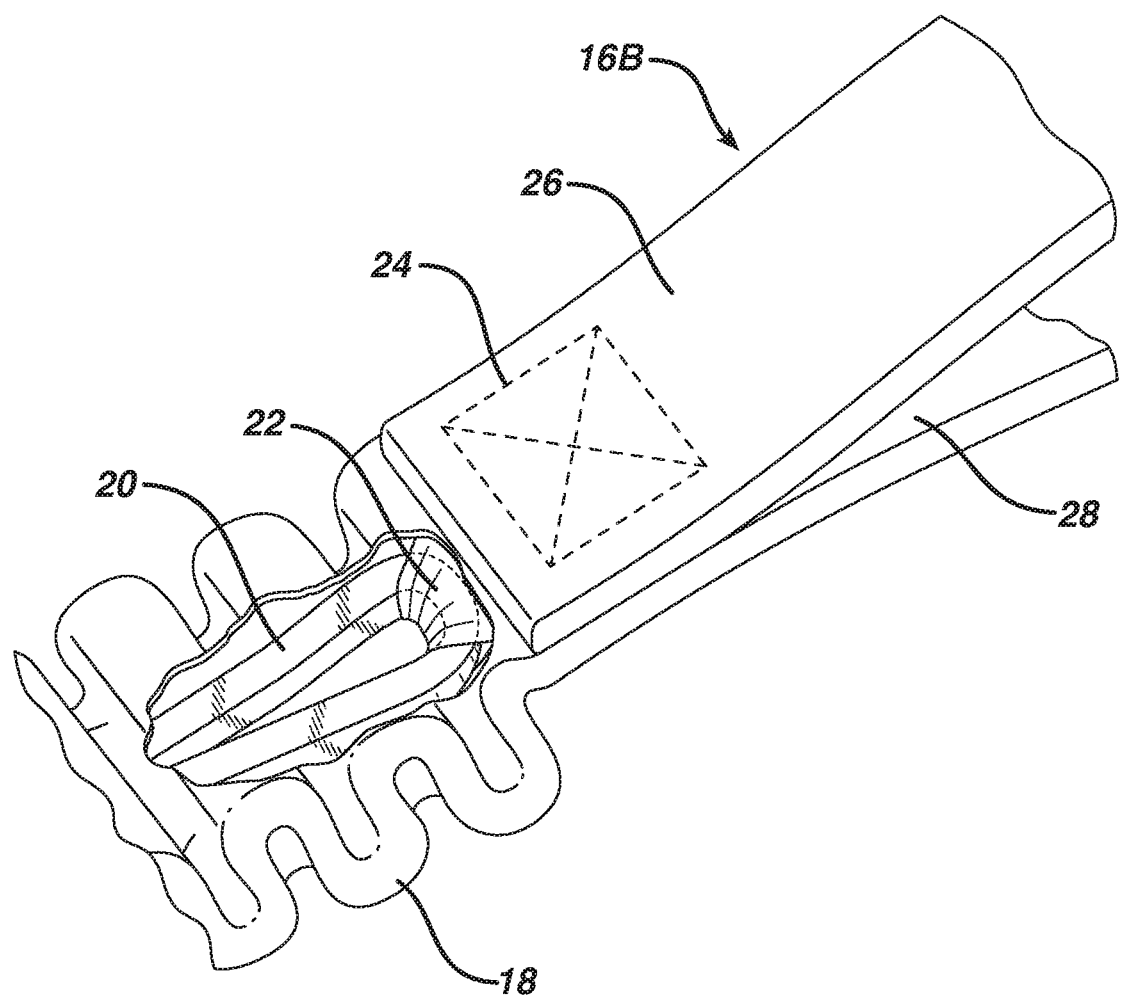
FIG. 3 is an enlarged, partially cut-away perspective view showing the connection between the band, attachment strap and webbing sleeve.

The band is secured within the sleeve at two attachment points, corresponding to the locations of the bases of the two loops 16A, 16B. Referring to FIG. 3, an attachment strap 22 is looped around the band 20 and is secured in place by stitching (bar tack 24) that extends through the free end 26 and standing end 28 of the webbing at the base of the loop 16B. The attachment strap is formed of a material selected to not cut through or abrade the material of the band under normal conditions of use. For example, one suitable material is woven polyester.

The width of the strap is selected to be sufficient to allow a secure attachment via the bar tack, without being so wide that it cannot be threaded through the loop of the band within the sleeve, while the length is selected to allow both ends to be securely stitched through by the bar tack.

Advantageously, the connecting straps described herein have features that provide enhanced safety. For example, the straps tend to smoothly elongate under tension, rather than jerking the user who is being towed. In this regard, it is generally preferred that the webbing sleeve have a small amount of elasticity in order to smooth the transition when the webbing sleeve takes the load at full elongation of the band.

Moreover, due to the protection provided by the sleeve and the robust nature of the band, the connecting strap can be subjected to relatively high forces, and suddenly applied forces, without danger of the inner band failing.

In other embodiments, the band may have a rectangular cross-section, or a non-polygonal cross-section, e.g., round or oval.

In some cases, one or both of the loops may be longer, or of adjustable length, or may include a hook to allow the loop to be unfastened for positioning around a user's waist or a large object.

Embodiments of the connecting strap can be used in a wide variety of applications, in addition to the bicycling application discussed above. For example, the two users may be on skis, paddleboards, skates, e-bikes, motorbikes, or other types of sports equipment, or the users can be running, hiking or walking. Rather than assisting with uphill or flat travel, the connecting strap can be used to provide braking during downhill travel, in which case the stronger user would be behind the weaker. The connecting strap can also be used as a dog leash, or when skijoring or bike-joring. In addition, the connecting strap can be used to pull an inanimate object when it is desired to not have a jerky connection, for example when skiing with a sled or pulk.

In certain applications, embodiments of the connecting strap 10 may be used in conjunction with one or more additional straps to facilitate easy and safe connection between two users. For example, in applications where two motorbikes are to be connected together, the use of one or more supplemental connection straps may assist in forming a safe, secure, and easy-to-use connection.

Figure 7:
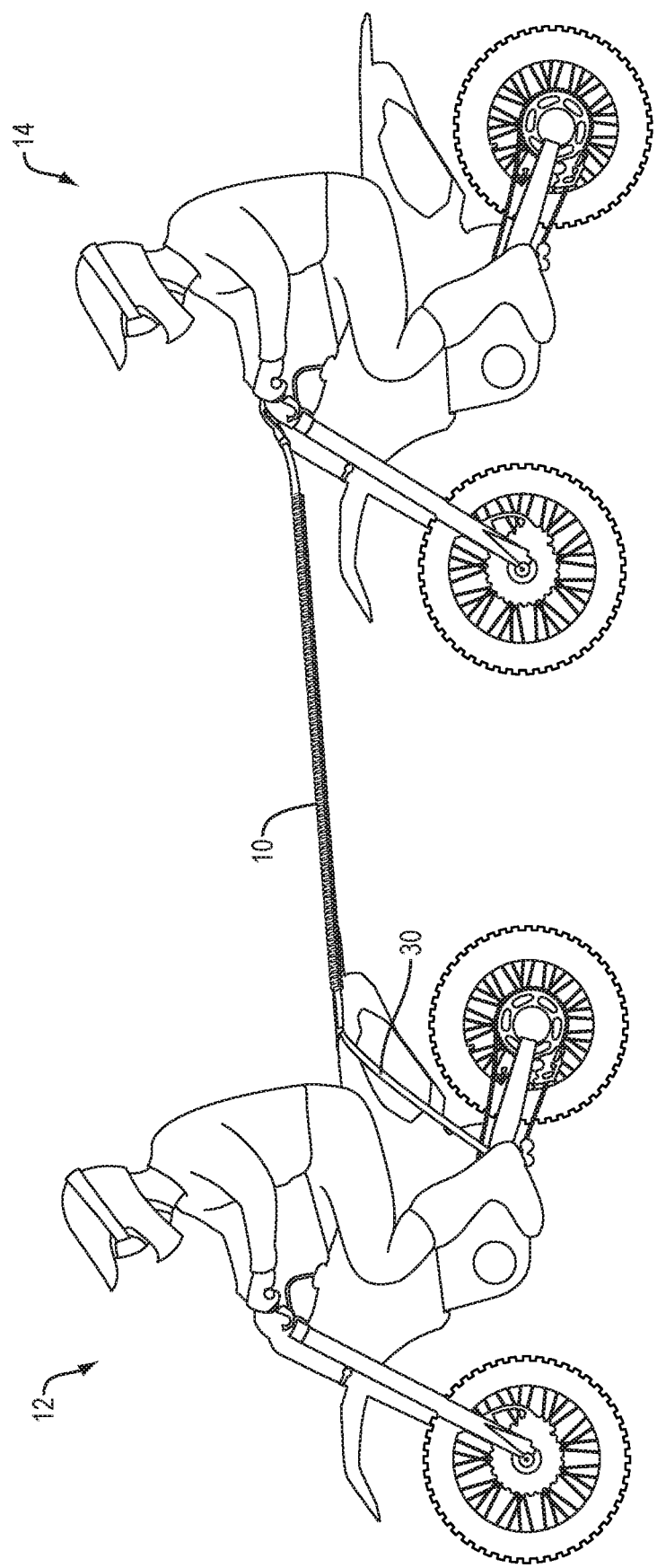
FIG. 7 is a perspective view of a pair of users using a connecting strap according to one implementation while riding motorcycles.

Referring to FIG. 7, in one example, the connecting strap 10 is used to allow a pair of users 12, 14 of potentially different abilities to motorcycle together. In this example, a first supplemental strap 30, referred to herein as a peg strap, is used in combination with the connecting strap 10 to facilitate attaching the connection strap 10 to the motorbike of the first/leading user 12. The peg strap 30 is looped over and attached to the motorbike of the first user 12 and attached to the connecting strap 10, as discussed further below with reference to FIGS. 9A-C and 10A-B.

Figure 8:
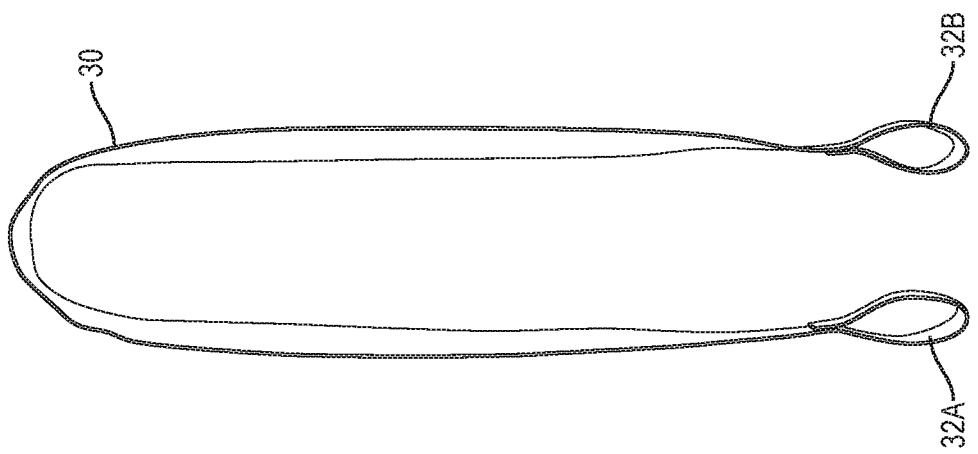
FIG. 8 is a perspective view of a peg strap according to one implementation.

As shown in FIG. 8, the peg strap 30 includes peg loops 32A, 32B respectively located at each end of the peg strap 30. The peg loops 32A, 32B may be formed by folding free ends of the peg strap 30 back on itself and stitching the end to the strap to form a loop. Alternatively, the peg loops 32A, 32B may be formed using any method known for forming loops in the rope or strapping arts.

Figure 9A:
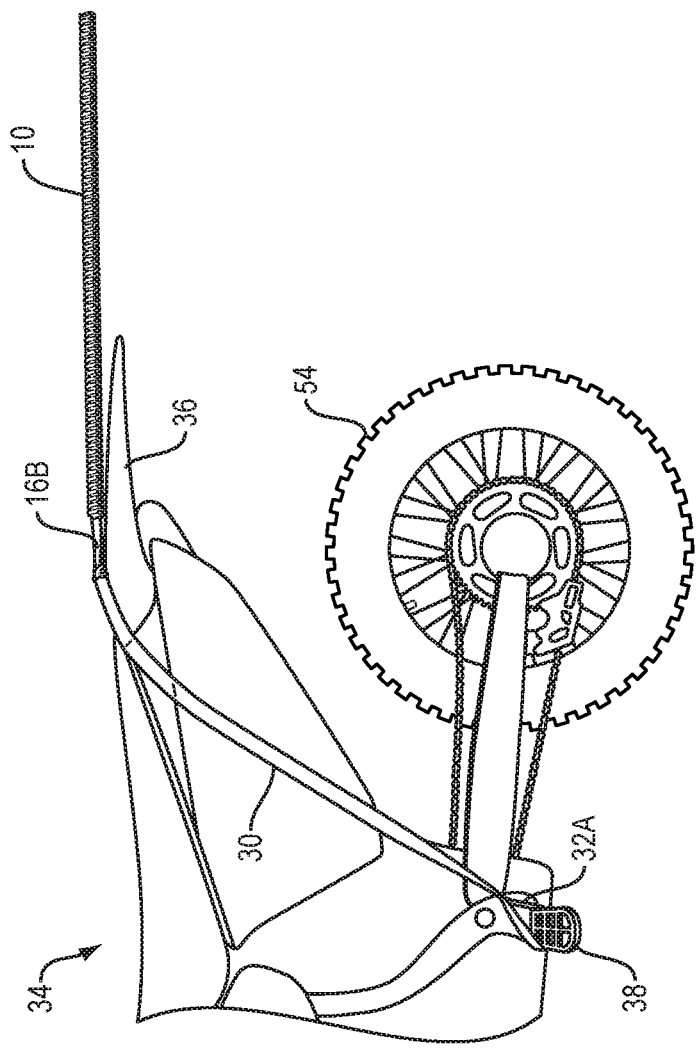
FIG. 9A is a side perspective view showing an example of a peg strap attached to a motorcycle.
Figure 9B:
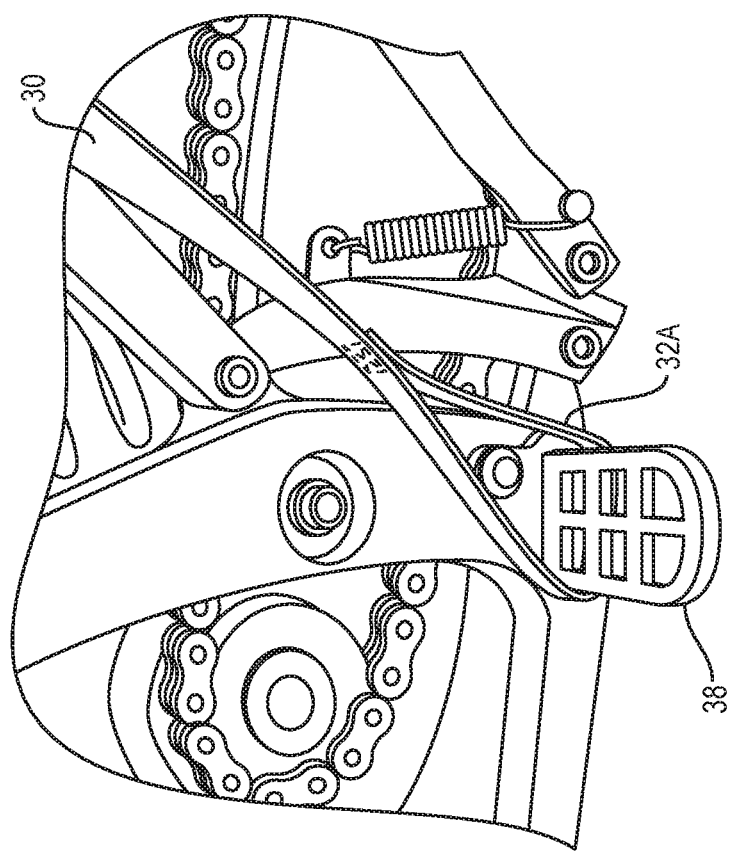
FIG. 9B is a more detailed view of a portion of FIG. 9A showing the peg strap attached to the foot peg of the motorcycle.
Figure 9C:
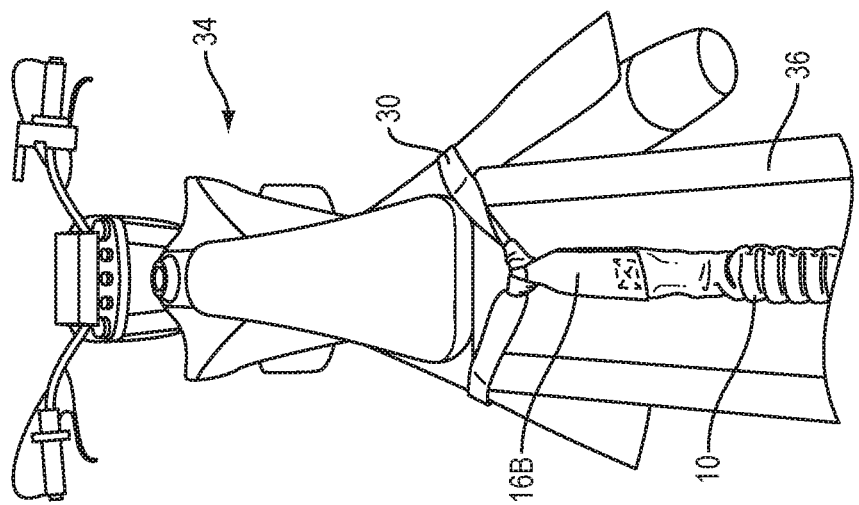
FIG. 9C is a top perspective view showing an example of a peg strap attached to a motorcycle.

Referring to FIGS. 9A-C, the peg strap 30 may be draped over the back of the motorbike 34, optionally over an extending portion 36 that extends rearwards (over the rear wheel 54) from the seat, and the peg loops 32A and 32B may be hooked around respective foot pegs 38 of the motorbike 34. This arrangement securely attaches the peg strap 30 at both ends and allows quick and easy attachment and removal. The connecting strap 10 is attached to the peg strap 30 as shown in FIG. 9C. The connecting strap 10 is preferably attached at approximately a center (measured along a length of the peg strap) of the peg strap 30, as shown in FIG. 9C. Rearward pulling force or tension from the connecting strap 10 creates some pressure on the top of the motorcycle 34, but the towing load is put onto the foot pegs 38 which typically are bolted to the frame of the motorcycle, thus making for a very strong and safe anchor. In addition, by draping over the top of the motorcycle (e.g., over the seat and/or the portion 36 behind the first user 12) the peg strap 30 holds the connecting strap 10 up high away from the rear tire of the motorbike, thereby preventing the connecting strap 10 from getting caught in the rear wheel 54.

The connecting strap 10 may be attached to the peg strap 30 in any of numerous ways. In one example, prior to hooking at least one of the peg loops 32A and 32B around a respective foot peg 38 of the motorbike 34, one end of the peg strap 30 may be passed through one of loops (e.g., loop 16B) of the connecting strap 10. Thus, the connecting strap 10 may be simply attached to the peg strap 30 by the loop 16B. However, this arrangement may allow the loop 16B of the connecting strap 10 to slide along at least a part of the length of the peg strap 30, particularly when there is less tension on the straps and/or when sideways force may be imparted to the strap, for example, when the motorbikes turn a corner. This sliding movement may compromise the security and/or safety of the connection. Therefore, in certain examples, a more secure method of attaching the peg strap 30 to the connecting strap 10 may be used.

Figure 10A:
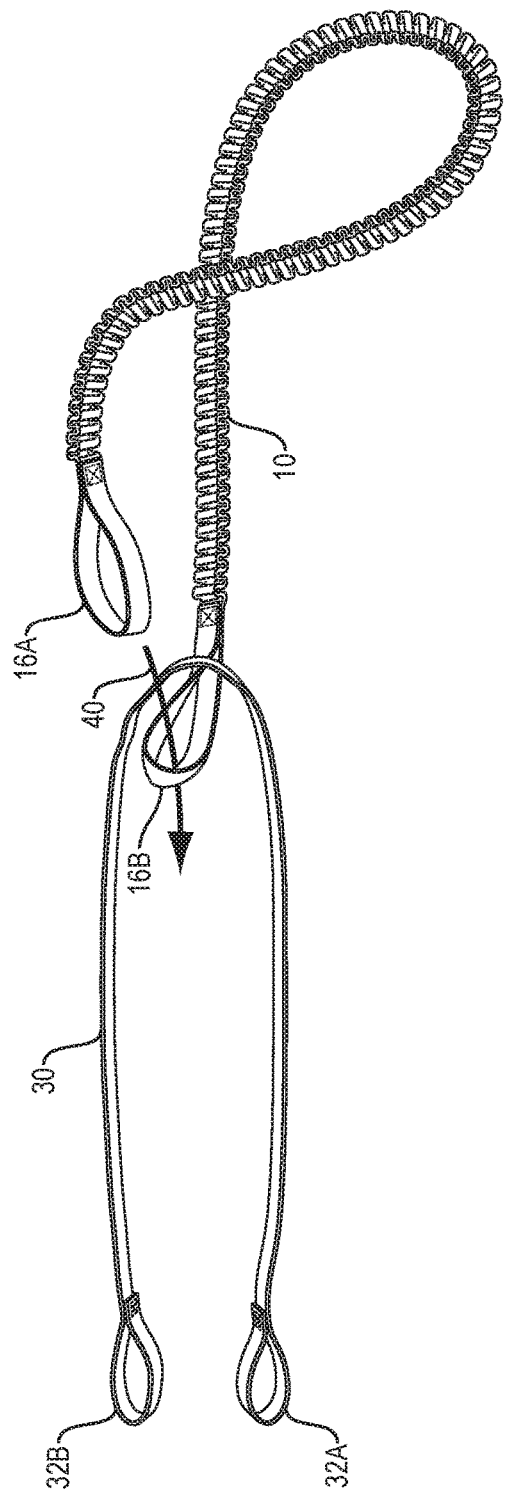
FIG. 10A is a perspective view showing an example of a method of attaching a connecting strap to a peg strap according to one implementation.
Figure 10B:
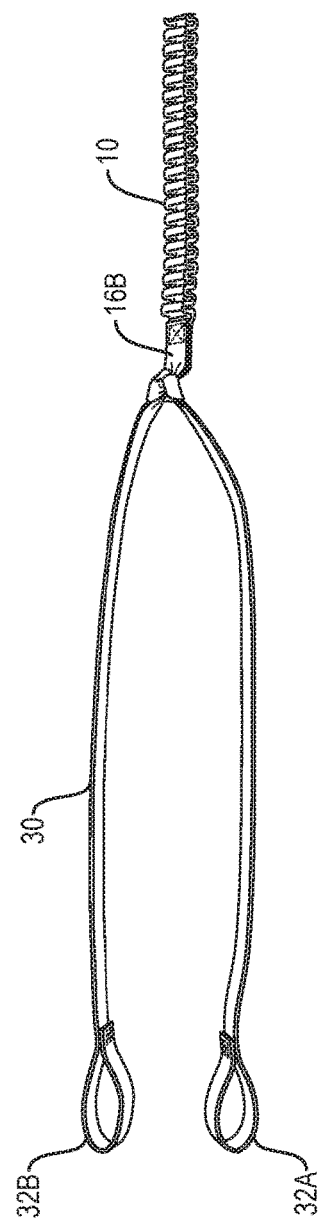
FIG. 10B is a perspective view showing connection of the connecting strap and the peg strap of FIG. 10B.

Referring to FIGS. 10A and 10B, in one example, a method of attaching the peg strap 30 to the connecting strap 10 includes passing one end (e.g., loop 16B) of the connecting strap 10 under the peg strap 30 (which may be done before or after the peg loops 32A and 32B are hooked around the foot pegs 38 of the motorbike 34) and passing the other end (e.g., loop 16A) of the connecting strap 10 through the loop 16B, as shown in FIG. 10A. In FIG. 10A, arrow 40 indicates the passing movement and direction of the loop 16A of the connecting strap 10 through the loop 16B. The connecting strap 10 may then be pulled tight to form a secure knotted attachment between the connecting strap 10 and the peg strap 30, as shown in FIGS. 9C and 10B. Advantageously, tension on the connecting strap 10 tightens the knot, thus ensuring that the straps will not accidentally separate during use. However, the knot may be easily and quickly undone by a user when disconnection is desired.

The peg strap 30 may be made of various different materials. Embodiments of the peg strap 30 should be strong enough to handle the forces that may be encountered during the activity and not break during use. In addition, the peg strap 30 may made of a material that is substantially inextensible. The length of the peg strap 30 may be selected such that the peg strap 30 hooks over the motorcycle 34 to the left and right foot pegs 38 with enough length to pull backward on the motorcycle 34 toward the end of the seat (as shown in FIG. 9A), but not too far to pull off the back of the bike. Further, the peg loops 32A and 32B should be sufficiently sized to fit easily around the foot pegs 38, but not so large that they could easily slip off during use.

In one example, the peg strap 30 is made of a nylon webbing having a width of approximately one inch and a thickness in a range of 0.070 to 0.075 inches. However, in other examples, the peg strap 30 may be made of a nylon or woven polypropylene webbing with different dimensions. In one example, the nylon webbing has a breaking strength of 3000 pounds, with a maximum recommended working load of 1000 pounds. In addition, in one example, the nylon webbing has a melting point of 380 degrees Fahrenheit. However, in other examples, the peg strap 30 may be made of other materials, including any rope, webbing, strapping, or other material having sufficient strength (i.e., capable of handling a working load of at least 1000 pounds) and flexibility.

In certain examples, the peg strap 30 has a length (i.e., measured end-to-end) in a range of 60 inches to 80 inches, and in one example, the peg strap 30 has a length of 67 inches. In certain examples, the peg loops 32A and 32B each has a length, when flattened against a surface, of from about 3 to 7 inches, and in one example, the length of each peg loop 32A, 32B is about 5 inches. In other embodiments, the peg strap 30 may have a different length and/or differently sized peg loops 32A, 32B, optionally depending on the size the configuration of the motorbike(s) with which it is to be used.

In certain embodiments, for motorbike and optionally other applications, the connecting strap 10 and the peg strap 30 may be used together as a kit and attached to one another as discussed above. In another embodiment, a modified connecting strap may be implemented that combines the functionality and structure of both the connecting strap 10 and the peg strap 30.

Figure 11:
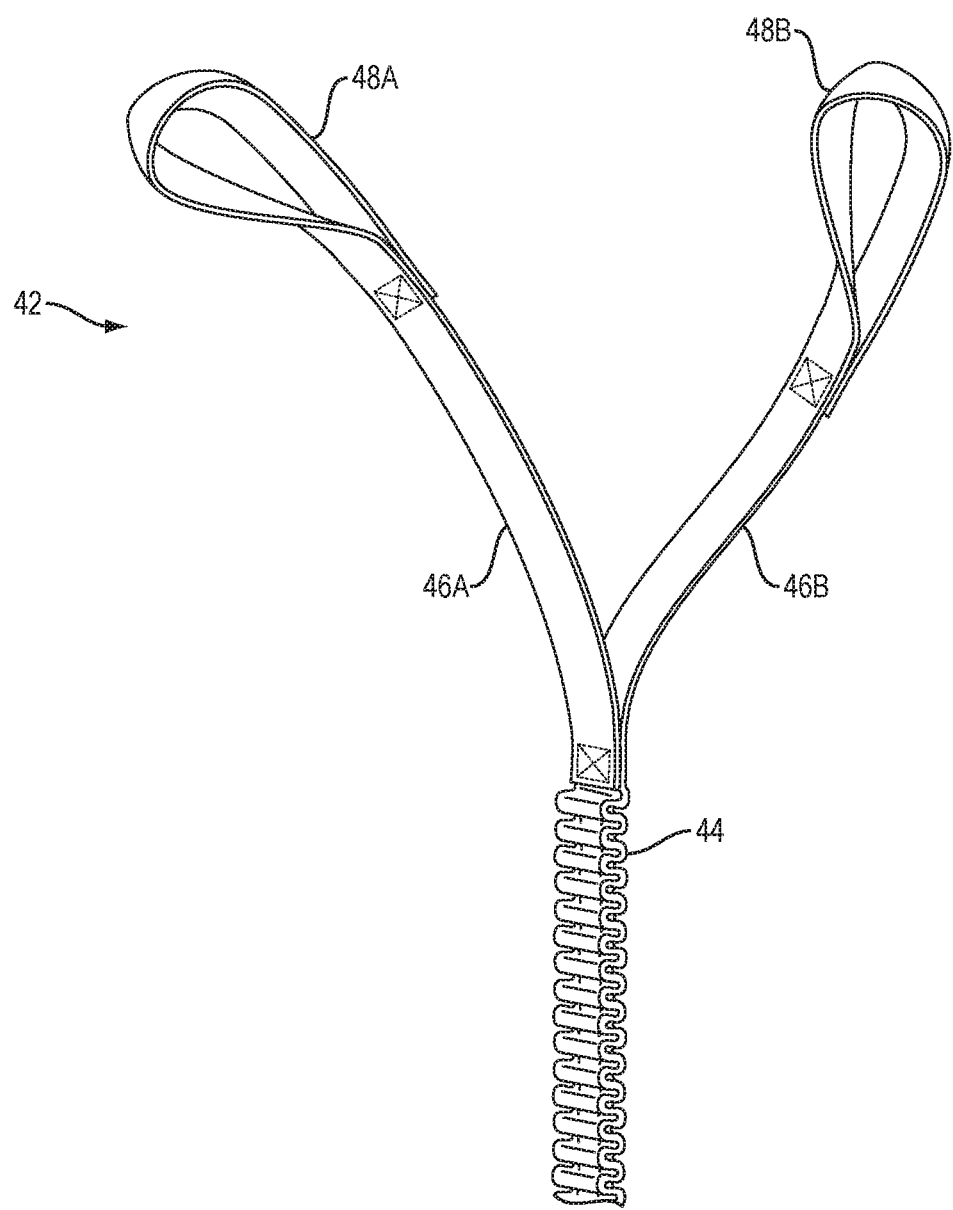
FIG. 11 is a perspective view of an example of a Y-strap according to one implementation.

For example, referring to FIG. 11 there is illustrated an example of a modified connecting strap, referred to herein as a Y-strap 42 that may replace the combination of the connecting strap 10 and the peg strap 30. The Y-strap 42 has a length portion 44 corresponding to (i.e., having the same construction and materials as) the connecting strap 10 discussed above. However, at one end, the loop 16A or 16B of the connecting strap 10 is replaced with a "Y" structure that includes two strap portions 46A and 46B, as shown in FIG. 11. The two strap portions 46A and 46B may be made of a webbing, rope, or other strap material that is sewn or otherwise attached to the end of the length portion 44. Alternatively, the two strap portions 46A and 46B may include extensions of the outer sleeve 18 of webbing material of the connecting strap 10 discussed above. For example, the free end 26 and the standing end 28 of the webbing may extend beyond the attachment area of the band 20, forming the strap portions 46A and 46B instead of the loop 16A or 16B. Each strap portion 46A and 46B includes a corresponding peg loop 48A, 48B for attachment to the foot pegs 38 of the motorbike 34, as discussed above. Thus, the Y-strap 42 may be laid across the back of the motorbike 34 and the peg loops 48A, 48B hooked around the foot pegs 38 while the other end of Y-strap 42 is attached to a second motorbike (similar to as shown in FIG. 7), and the Y-strap 42 functions the same as the combination of the connecting strap 10 and the peg strap 30.

As discussed above, for certain motorbike applications, one end of the connecting strap 10 may be attached to the peg strap 30 that is attached to the motorbike of the leading user 12. The other end of the connecting strap 10 (or the single end of the Y-strap 42) is attached to the motorbike of the trailing user 14. Connection to the motorbike of the trailing user 14 may be made in a variety of different ways. In one example, the loop 16A of the connecting strap 10 may be hitched around a feature on the trailing motorbike such as a portion of the handlebars, for example. In another example, the connecting strap 10 may be hitched directly to the handlebars or frame of the trailing motorbike by being looped through itself, similar to the connection method discussed above with reference to FIGS. 10A and 10B. However, in other examples, another supplemental strap may be used to attach the connecting strap 10 to the trailing motorbike.

In certain examples, a supplemental strap referred to herein as a release strap 50 may be used to attach the connecting strap 10 to the vehicle, for example, motorbike or bicycle, of the trailing user 14. The release strap 50 is a friction-based instant detachment system accessory for the connecting strap 10.

FIG. 12 shows an example of the release strap 50 having an end-loop 52 at one end. The release strap 50 may be made of any rope, webbing, strapping, or other material having sufficient strength (i.e., capable of handling the forces that may be encountered during use without breaking) and flexibility. In certain examples, the release strap 50 may be made of the same or a similar material as the peg strap 30, and may have the same or similar construction.

The release strap 50 may be attached to the connecting strap 10 using the end-loop 52 and a loop 16A of the connecting strap 10. Referring to FIGS. 13A and 13B, in one example, the release strap 50 may be attached to the connecting strap 10 by passing the release strap 50 through the loop 16A of the connecting strap 10 and passing the release strap 50 around the connecting strap 10 and through its own end-loop 52, as shown in FIG. 13A. Pulling the release strap 50 tight then creates a secure knotted connection between the release strap 50 and the connecting strap 10, as shown in FIG. 13B. The release strap 50 thus becomes an extension of the connecting strap 10. Once attached to the connecting strap 10, the release strap 50 provides a simple, safe, secure, and yet easily-released attachment to the bike (bicycle or motorbike) of the trailing user 14.

Figure 14A:
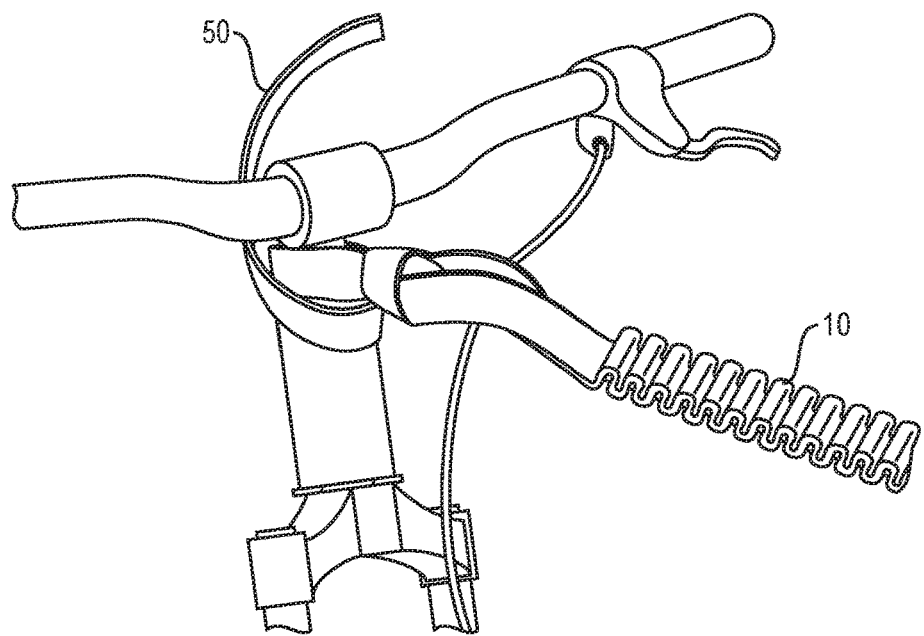
FIG. 14A is a perspective view showing an example of a method of attaching a release strap to a bicycle according to one implementation.
Figure 14B:
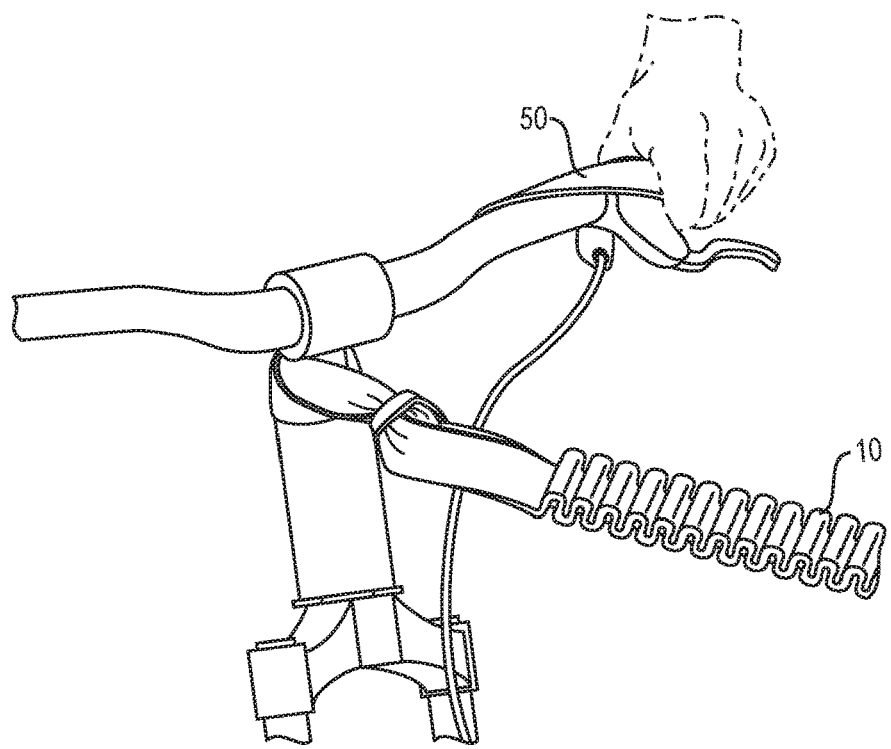
FIG. 14B is a perspective view showing the release strap of FIG. 14A wrapped around the bicycle and held by a user.

Referring to FIGS. 14A and 14B, there is illustrated an example of a method of attaching the release strap 50 (connected to the connecting strap 10 as discussed above) to a bicycle. The same method of attachment may be used to attach the release strap 50 to a motorbike. In this example, the release strap 50 is wound around the stem or frame of the bike and looped up over the handlebars, as shown in FIG. 14A. The trailing user 14 holds the release strap 50 in their grip, as shown in FIG. 14B. In this manner, while the connection is maintained by the grip of the user 14, the load forces are taken by the frame of the bike, such that the user 14 does not require a lot of strength to maintain the connection. If the user 14 wishes to disconnect from the bike of the leading user 12, the user 14 may simply loosen their grip on the release strap 50, allowing the system to immediately release.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. It is to be appreciated that embodiments of the methods and apparatuses discussed herein are not limited in application to the details of construction and the arrangement of components set forth in the foregoing description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Accordingly, the foregoing description and drawings are by way of example only, and the scope of the invention should be determined from proper construction of the appended claims, and their equivalents.

What is claimed is:

1. A connection strap system comprising:
   a connecting strap including a webbing sleeve having a first end and a second end and having a loop at each end, each loop having a base and a free end, and disposed within the webbing sleeve, a band of elastic material extending in a continuous loop, the connecting strap further including an attachment strap, adjacent each loop, configured to secure a portion of the band to the webbing at the base of each loop; and
   a peg strap having a peg-loop at each end, the connecting strap being attached to the peg strap.

2. The connection strap system of claim 1, wherein each attachment strap has two ends and is looped through the band and secured by stitching both ends of the attachment strap to the webbing; and
   wherein each loop is formed by doubling a free end of the sleeve back and securing the free end in place with the stitching that secures the ends of the attachment strap to the webbing sleeve, thereby forming the base of the loop.

3. The connection strap system of claim 1, wherein the webbing sleeve is configured for a maximum elongation of from 3:1 to 4:1; and
   wherein the band is configured to have a stretch ratio of at least 4:1.

4. The connection strap system of claim 1, wherein the connecting strap is looped around a central region of the peg strap, an end of the connecting strap is folded over the peg strap and passed through one of the loops to form a connection between the connecting strap and the peg strap, and the connection is pulled tight to form a knot around the central region of the peg strap.

5. The connection strap system of claim 1, wherein the webbing sleeve and the peg strap are each formed of a material having an extensibility that is less than the extensibility of the band of elastic material.

6. The connection strap system of claim 1, wherein the peg strap has a length in a range of 60 inches to 80 inches.

7. The connection strap system of claim 6, wherein each peg loop has a flattened length in a range of 3 inches to 7 inches.

8. The connection strap system of claim h wherein the peg strap has a breaking strength of 3000 pounds.

9. The connection strap system of claim 1, further comprising:
   a release strap attached to the connecting strap such that the connecting strap is connected at one end to the peg strap and at an opposite end to the release strap, the connecting strap being thus positioned between the peg strap and the release strap.

10. The connection strap system of claim 9, wherein the release strap is formed of a material having an extensibility that is less than the extensibility of the band of elastic material.

11. The connection strap system of claim 9, wherein the release strap includes an end-loop at one end, the release strap being attached to the connecting strap by being passed through and looped around one loop of the connecting strap and passed through the end-loop.

12. A method of connecting two motorcycles together, the method comprising:
   draping a peg strap over a top of a first motorcycle, the peg strap having a peg loop at each end;
   looping each peg loop of the peg strap around a corresponding foot peg of the first motorcycle;
   attaching a first end of a connecting strap to a central region of the peg strap between the ends of the peg strap; and
   attaching a second end of the connecting strap to a second motorcycle.

13. The method of claim 12, wherein the connecting strap includes a first loop at its first end and a second loop at its second end, and wherein attaching the first end of the connecting strap to the peg strap includes:
   looping the first end of the connecting strap around the central region of the peg strap;
   passing the second end of the connecting strap over the peg strap and through the first loop to form a first connection between the connecting strap and the peg strap; and
   pulling the first connection tight to form a knot around the central region of the peg strap.

14. The method of claim 13, wherein attaching the second end of the connecting strap to the second motorcycle includes:
   attaching a first end of a release strap to the second end of the connecting strap; and
   wrapping a second end of the release strap around a portion of a handlebar region of the second motorcycle.

15. The method of claim 14, wherein the release strap includes an end-loop at the first end of the release strap, and wherein attaching the first end of the release strap to the connecting strap includes:
   passing the release strap through the second loop of the connecting strap;
   wrapping the release strap around the second of the connecting strap and passing a second end of the release strap through the end-loop to form a second connection between the release strap and the connecting strap; and
   pulling the second connection tight to secure the release strap to the connecting strap.

16. A Y-strap for connecting two motorcycles together, the Y-strap comprising:
   a length portion including a webbing sleeve having first and second ends, and a band of elastic material disposed within the webbing sleeve and extending in a continuous loop, the webbing sleeve including a first loop disposed at the first end of the webbing sleeve, the length portion further including a pair of attachment straps each configured to secure a portion of the band to the webbing sleeve at the first and second ends; and first and second strap portions extending from the second end of the webbing sleeve, each of the first and second strap portions having a peg loop formed at respective ends of the first and second strap portions distal to the webbing sleeve.

17. The Y-strap of claim 16, wherein the first and second strap portions are extensions of the webbing sleeve.

18. The Y-strap of claim 16, wherein the first and second strap portions and the webbing sleeve are made of a material having an extensibility that is less than the extensibility of the band of elastic material.

19. The Y-strap of claim 16, wherein each attachment strap has two ends and is looped through the band and secured by stitching both ends of the attachment strap to the webbing sleeve.

20. The Y-strap of claim 16, wherein the first loop of the connecting strap is formed by doubling a free end of the webbing sleeve back and securing the free end in place with the stitching that secures the ends of the attachment strap to the webbing sleeve, thereby forming a base of the loop at the first end of the webbing sleeve.

\* \* \* \* \*